US010562737B2

(12) United States Patent
Friedli et al.

(10) Patent No.: US 10,562,737 B2
(45) Date of Patent: Feb. 18, 2020

(54) SYSTEM AND METHOD FOR PROTECTING THE PRIVACY OF PEOPLE IN A LIFT SYSTEM

(71) Applicant: Inventio AG, Hergiswil (CH)

(72) Inventors: Paul Friedli, Remetschwil (CH); Lukas Finschi, Ebicon (CH)

(73) Assignee: Inventio AG, Hergiswil (CH)

( * ) Notice: Subject to any disclaimer, the term of this patent is extended or adjusted under 35 U.S.C. 154(b) by 333 days.

(21) Appl. No.: 15/522,167

(22) PCT Filed: Oct. 16, 2015

(86) PCT No.: PCT/EP2015/074054
§ 371 (c)(1),
(2) Date: Apr. 26, 2017

(87) PCT Pub. No.: WO2016/066457
PCT Pub. Date: May 6, 2016

(65) Prior Publication Data

US 2018/0362296 A1 Dec. 20, 2018

(30) Foreign Application Priority Data

Oct. 29, 2014 (EP) .................................... 14190910

(51) Int. Cl.

| | |
|---|---|
| ***B66B 1/28*** | (2006.01) |
| ***G05B 15/00*** | (2006.01) |
| ***B66B 5/00*** | (2006.01) |
| ***B66B 1/30*** | (2006.01) |
| ***B66B 3/00*** | (2006.01) |
| ***B66B 13/14*** | (2006.01) |

(52) U.S. Cl.
CPC .............. *B66B 5/0012* (2013.01); *B66B 1/30* (2013.01); *B66B 3/002* (2013.01); *B66B 13/14* (2013.01)

(58) Field of Classification Search
CPC ......... B66B 5/0012; B66B 13/14; B66B 1/30; B66B 3/002
USPC .......................................................... 187/247
See application file for complete search history.

(56) References Cited

U.S. PATENT DOCUMENTS

2014/0226855 A1* 8/2014 Savvides ............ G06K 9/00771 382/103
2016/0031675 A1* 2/2016 Silvennoinen .......... B66B 1/468 187/247

FOREIGN PATENT DOCUMENTS

CN 1081782 A 2/1994
EP 1878684 A1 1/2008
(Continued)

*Primary Examiner* — Jeffrey Donels
(74) *Attorney, Agent, or Firm* — BakerHostetler

(57) ABSTRACT

A lift system for protecting the privacy of passengers. The lift system having a lift car that can be moved between floors of a building. The lift car having a video camera arranged in the lift car. The video camera being a part of a video system that also includes a video monitor for displaying information relating to the interior of the lift car. A video control device is communicatively connected to and controls the video system in a selective manner according to one of several operating modes. The several operating modes include a first operating mode in which the video system is deactivated or activation is blocked, so that the video system remains in an inactive state, if a passenger asks for the video system to be deactivated. When in the first operating mode the video system remains in the inactive state for as long as the passenger is in the lift car.

16 Claims, 3 Drawing Sheets

(56) References Cited

FOREIGN PATENT DOCUMENTS

| | | | |
|---|---|---|---|
| JP | 2000-169054 | A | 6/2000 |
| JP | 2002-003102 | A | 1/2002 |
| JP | 2003-063746 | A | 3/2003 |
| JP | 2004-048519 | A | 2/2004 |
| JP | 2009-190847 | A | 8/2009 |
| JP | 2011026025 | A | 2/2011 |

* cited by examiner

SYSTEM AND METHOD FOR PROTECTING THE PRIVACY OF PEOPLE IN A LIFT SYSTEM

CROSS-REFERENCE TO RELATED APPLICATION

This application is the national phase application under 35 U.S.C. § 371 claiming the benefit of priority based on International Patent Application No. PCT/EP2015/074054, filed on Oct. 16, 2015, which claims the benefit of priority based on European Patent Application No. 14190910.1, filed on Oct. 29, 2014. The contents of each of these applications are herein incorporated by reference.

FIELD OF THE INVENTION

The technology described herein generally relates to lift systems in which individual interests can be taken account, for example the interests of passengers travelling in lift cars or operators of lift systems (building owners and/or building management companies), or both.

JP 2000-169054 describes a lift system with a video system which is intended to combat crime. For this purpose the video system has a video camera in the interior of each lift car and a video monitor on each floor of the building which displays the images recorded by the video camera. This means that a passenger on the floor waiting for the lift can tell in advance whether there is a suspicious individual in the lift car that will be calling at this floor next.

The lift system known from JP 2000-169054 allows a waiting passenger to identify a suspicious individual within the car. The waiting passenger then has the opportunity of not getting into the car and/or notifying security staff. Apart from the legitimate interest in preventing crime, other interests should also be considered in a lift system. There is therefore a need for technology that enables interests of this kind to be taken into account.

SUMMARY OF THE INVENTION

One aspect of improved technology of this kind relates to a lift system comprising a lift car that can be moved between floors of a building, a video system with a video camera arranged in the lift car and a video monitor by means of which information relating to the interior of the lift car can be displayed. Moreover, the lift system has a video control device which is communicatively connected to the video system and which controls the video system in a selective manner according to one of several operating modes. In one embodiment, the video control device controls the video system according to a first operating mode if a passenger asks for the video system to be deactivated. In the first operating mode, the video system is deactivated or activation is blocked, so that the video system remains in an inactive state. The video system remains in the inactive state for as long as the passenger is in the lift car.

A further aspect of the technology relates to a method of operating a lift system of this kind. A control parameter is received by the video control device which selects one of several operating modes, depending on the control parameter received. A first operating mode is selected in one embodiment, if the control parameter corresponds to a deactivation command when a passenger requests deactivation of the video system. In the first operating mode, the video system is deactivated or its activation is blocked, so that the video system remains in an inactive state. The video system is controlled according to the selected operating mode, wherein the deactivation of the video system is maintained in the first operating mode for as long as the passenger is in the lift car.

This technology allows different interests to be taken into account. On the one hand, it satisfies a need for the security of individuals wishing to use the lift system, as a person waiting for the lift receives information on the interior of a car even before the lift car has arrived at the floor. This enables them to decide whether they wish to use the car or not. The technology also satisfies the interests of a building owner and/or property management company wishing to provide their users and residents with a safe means of transport. On the other hand, the technology also satisfies the interests of a passenger travelling in a lift car, in that it offers a certain degree of privacy. The technology described here preserves these interests, in that different operating modes can be selected.

The information relating to the interior of the lift car that can be displayed on a video monitor with this technology can be flexibly selected. In the exemplary embodiments described herein, the information is contained in a video recording which comprises real-time images from the lift car, for example. However, it may also comprise text, individual (freeze) frames and/or symbols.

In one exemplary embodiment the lift system has a lift control system and a device for identifying an authorization parameter assigned to a passenger. The lift control system is communicatively connected to the video system and the device for identifying the authorization parameter, in order to control the video system according to the operating mode. With the help of the authorization parameter, certain rights can be granted to an individual, in order to offer them the desired privacy.

In one exemplary embodiment of the lift system, a first input unit is disposed on a floor on which a video monitor is present. The first input unit is provided for entering a control parameter for the video system, wherein the control parameter is used to select an operating mode. This enables a person waiting for the lift on a floor to ask for the video footage to be displayed, so that they can assess the situation in the car in which they will be travelling even before the lift journey begins.

In one exemplary embodiment of the lift system, there is a second input unit in the lift car, wherein the second input unit is provided for the input of a control parameter for the video system and wherein the control parameter is used for selecting an operating mode. By means of the input unit in the car, a passenger in the car can stop a video recording, in order to preserve privacy.

An indicator present within the lift car in an exemplary embodiment of the lift system also helps in preserving privacy. This indicator indicates an operating state of the video camera. It tells the passenger in the car whether and when a video recording is taking place.

In relation to the operation of the video system, the technology advantageously offers a plurality of operating modes and therefore the flexibility to safeguard the aforementioned interests. The aforementioned first operating mode can be selected in an exemplary embodiment if the control parameter corresponds to a deactivation command. In this operating mode, a passenger can disable a video recording, in order to preserve privacy. So that not every passenger is able to request this operating mode, in one exemplary embodiment it can be determined whether a passenger requesting deactivation of the video system is authorized to do so or not. Deactivation of the video system only takes place if the passenger is authorized to deactivate it.

In one exemplary embodiment, a second operating mode is selected when the control parameter corresponds to an activation command, wherein in the second operating mode the video system is activated by the video control device and the activation is displayed in the lift car by means of an indicator. In this operating mode, a person waiting on a floor can ask for the video recording to be displayed.

In an exemplary embodiment, the deactivation is cancelled after a specified condition is met. The preset condition may be the lapse of a predefined time period or end of a journey from a boarding floor to a destination floor. It is thereby ensured that the deactivation is only active for a limited period of time and the video system then (actively) adopts a defined initial state again.

If the passenger is a very important person (VIP), the deactivation of the video system in an exemplary embodiment can be maintained until the passenger has left the lift car. It is thereby ensured that no video footage is taken of this person.

In an exemplary embodiment, a third operating mode is selected when the control parameter corresponds to an anonymization command. In the third operating mode, an anonymized video recording is displayed on the video monitor from the interior the lift car. In this case, it is advantageous for both the information interests of a person waiting on the floor and also the privacy interests of a passenger to be taken into account. The person waiting for the lift finds out, for example, whether the cab is occupied and the passenger can rest assured that passenger details are rendered unrecognizable on the video recording, for example by pixilation.

In an exemplary embodiment of the lift system, the video control device controls the display of the video recording on the video monitor, so that a video recording is displayed in the original when a corresponding request command is present with which the request for an original video recording in the lift car is displayed. Here, too, it is advantageous for both the information interests of the person waiting for the lift and also the privacy interests of a passenger to be taken into account. This means that the passenger is informed that their personal details are once again recognizable or they will be recognizable again within a short period of time.

The technology described here also takes account of the security interests of people who live in apartments or work in premises which have direct access to a lift car. These individuals can decide with the help of information from the lift car whether to unlock a lift door (e.g. for a passenger known to them) or keep it locked (e.g. for a passenger whom they do not know). If a person wishes to unlock the lift door, they tap a corresponding key and a lift control system then receives a command to unlock the lift door. The lift control system unlocks the lift door, so that the passenger can leave the lift car on this floor.

If unlocking the lift door (for the time being or permanently) should not be desired, the technology offers a number of options. In one exemplary embodiment, an intercom system can be activated, so that the person can speak to clarify whether the lift door should in fact be unlocked. In another exemplary embodiment, the person may—either with or without speaking to the passenger initiate a control command (e.g. by tapping a key), as a result of which the lift control system activates the drive unit to take the lift car to the floor (departure floor or boarding floor) from which the passenger boarded the lift. Alternatively, the lift control system may, if no command to unlock the lift door is received, activate the drive unit after a specified period of time, in order to take the lift car to the boarding floor.

The technology advantageously also offers several options for displaying the information relating to the interior of the lift car. In an exemplary embodiment, the information is displayed on a video monitor disposed on a floor. Depending on the configuration, the information may only be displayed on a video monitor on the floor from the display was requested. In one exemplary embodiment, a video monitor (or else the functions thereof) may be integrated into a mobile electronic unit, so that the information is presented on the display of the mobile unit.

BRIEF DESCRIPTION OF THE DRAWINGS

In the following, different aspects of the technology are described in greater detail with the help of exemplary embodiments in conjunction with the figures. In the figures, the same elements have the same reference numbers. In the figures.

DETAILED DESCRIPTION OF CERTAIN EMBODIMENTS

Figure 1:
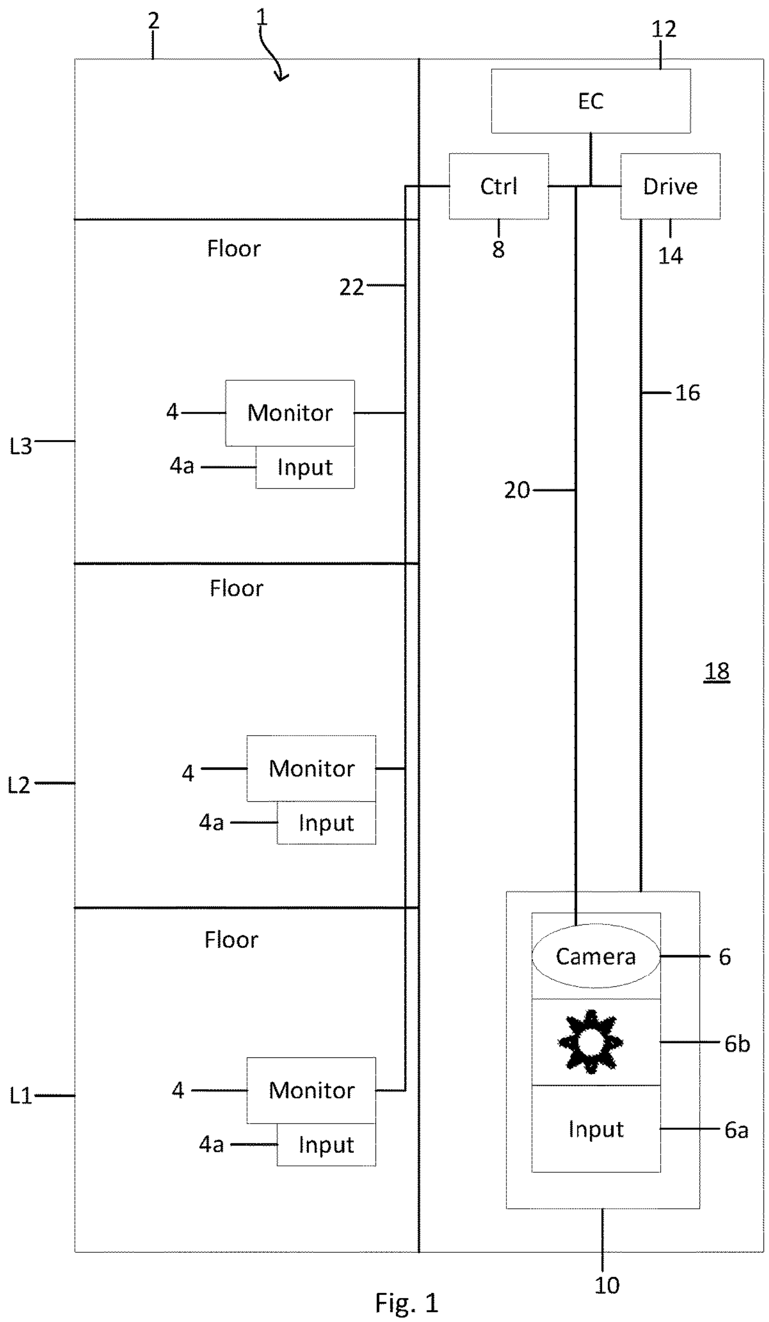
FIG. 1 shows a schematic representation of an exemplary embodiment of a lift system with a video system.

FIG. 1 shows a schematic representation of an exemplary embodiment of a lift system 1 in a building 2. The building 2 has a plurality of floors L1, L2, L3 which are served by the lift system 1, i.e. a passenger can be transported by the lift system 1 from a boarding floor to a destination floor. Depending on the building 2, the lift system 1 may be differently configured, for example as a traction lift with cables or belts, as a hydraulic lift, as a lift with multiple cars, or as a group of several lifts (e.g. a group of six lifts, wherein each lift has one lift car (per shaft). In the exemplary embodiment shown, the lift system 1 has a lift car 10 that can be moved in a lift shaft 18, hereinafter referred to as the car 10, which is connected by a support means 16 (cables or belts) to a drive unit 14 and is suspended on this drive unit 14. In this case it may be a traction lift, wherein further details, such as a counterweight and guide rails, for example, are not shown in FIG. 1. A lift control system 12 is connected to the drive unit 14 and activates the drive unit 14. The operation of a traction lift and the functions of a lift control system 12 are generally known to the person skilled in the art.

The lift system 1 shown in FIG. 1 has a video system comprising a video camera 6 and at least one video monitor 4. In the exemplary embodiment shown, the building 2 has three floors L1, L2, L3 and on each floor there is a video monitor 4. However, there may also be only two or more than three floors; it is also possible that not all floors are equipped with a video monitor 4. A video control device 8 is communicatively connected to the video camera 6 and the video monitor 4, in order to control the video camera 6 and the video monitor 4. In addition, the video control device 8 is communicatively connected to the lift control system 12.

A communicative connection in this description should be understood to mean a direct or indirect connection which allows one-way or two-way communication between two units. In this case, data signals and/or control signals are transmitted in a manner known per se. A connection of this kind may be made by an electrical line system (either as a system of point-to-point connections or as a bus system, wherein the units connected to the bus system are addressable), a radio system or a combination of a radio system and a line system. In FIG. 1, the communicative connection is depicted by way of example by lines 20, 22, wherein line 20 is between the video control device 8 and the car 10 and line 22 connects the video monitors 4 to the video control device 8. In one exemplary embodiment, the line 22 may be a bus system to which the video monitors 4 are connected.

In another exemplary embodiment, at least one video monitor 4 can be communicatively connected to the video control device 8 via a radio system. It is also possible in this case for the functions of the video monitor 4 (and possibly the functions of an input unit 4*a*) to be implemented in a mobile electrical device (e.g. a mobile phone, smart phone). This means that a user of this device can also watch a video recording remotely from the lift system 1 or the building 2 and possibly also make a request from there. An exemplary application for this purpose is described below in connection with an "apartment" mode.

The person skilled in the art will recognize that the video control device 8, or else the functions thereof, may form part of a video monitor 4, the video camera 6, the lift control system 12 or another component of the lift system 1 or of the building 2. In a case of this kind, the separate display of the video control device 8 in FIG. 1 could be dispensed with, for example. Depending on the configuration, therefore, the implementation of the communicative connection changes too. FIG. 1 should therefore be regarded as a basic illustration of an exemplary embodiment. Irrespective of a particular embodiment of the video control device 8, it controls the video monitors 4 and the video camera 6 according to one of several operating modes. Details on the functions of the video control device 8 and the operating modes are described in connection with FIG. 3-FIG. 6.

The video control device 8 controls the video camera 6 and the individual video monitors 4, in that it transmits control signals to the video camera 6 and the video monitors 4 and possibly receives signals from them. In order to generate the control signals, the video control device 8 evaluates control parameters and other signals which it receives from the lift control system 12, a first input unit 4*a* and a second input unit 6*a*, for example. The person skilled in the art will recognize that the video control device 8 can receive and evaluate signals from fewer than the aforementioned components or signals from additional components of the lift system 1, in order to generate the control signals. The first input unit 4*a* is located on a floor L1, L2, L3 or in the vicinity of a video monitor 4, and the second input unit 6*a* is located in the car 10. The video control device 8 has a programmable processor for this purpose which can access a storage medium. In an exemplary embodiment, the processor and the storage medium are integrated in the video control device 8.

As stated above, the lift system 1 may consist of a group of lifts. In a lift system 1 of this kind, it may be that several people on the same floor L1, L2, L3 are assigned different lifts for their desired journeys, for example if the lift system 1 is equipped with a destination control system. This means that in some cases several lift cars 10 will arrive at this floor L1, L2, L3 more or less simultaneously. Even with a conventional up/down control system with destination input in the lift car 10, in some cases several lift cars 10 will arrive at the floor L1, L2, L3 more or less simultaneously.

It may be the case here that several people wish to gain information about the interior of "their" lift car 10 and therefore want a video recording to be displayed. For cost reasons, the smallest possible number of video monitors 4 on a floor L1, L2, L3 is desirable, even when there is a group of lifts. If there is only one video monitor 4 on a floor L1, L2, L3, for example, the screen area of the video monitor 4 can be split using a technique known to the person skilled in the art as "split screen". The screen can be split according to the number of the video recordings required. In one exemplary embodiment, the individual video recordings can be displayed one after the other, for example with a fixed repetition rate. Each video recording indicates the lift car 10 or journey to which it relates, in order to inform the waiting passengers.

Figure 2:
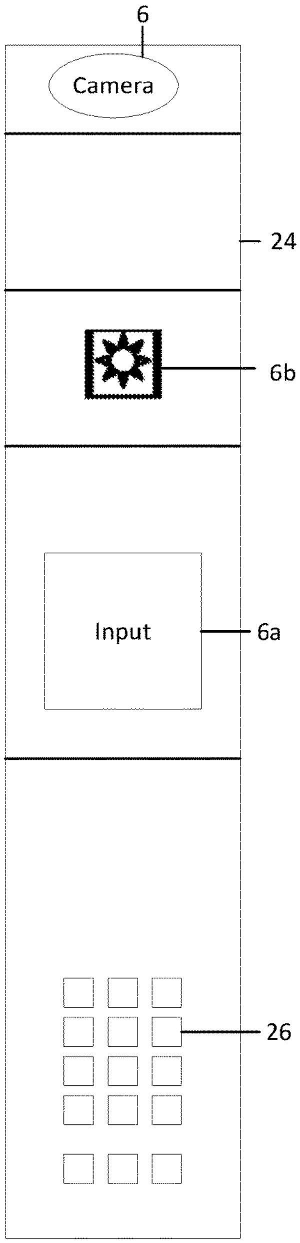
FIG. 2 shows a schematic representation of an exemplary embodiment of a control panel in a lift car of the lift system from FIG. 1.
Figure 3:
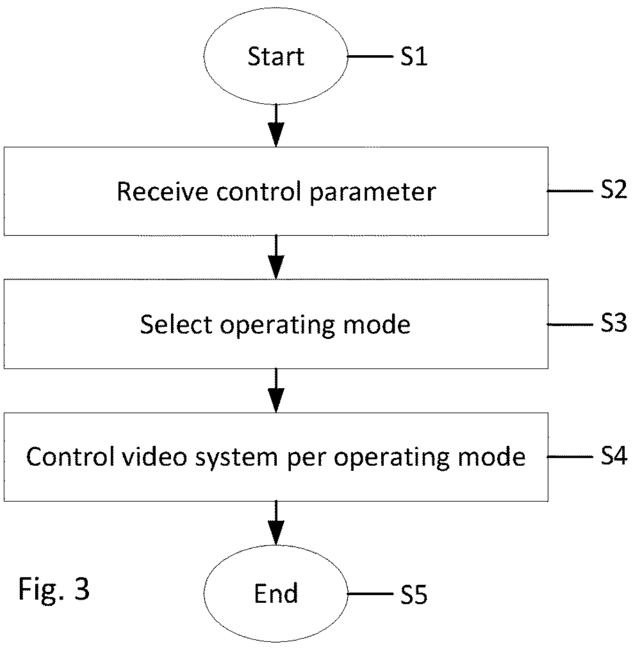
FIG. 3 shows an exemplary representation of a method of operating the lift system from FIG. 1.

FIG. 2 shows a schematic representation of an exemplary embodiment of a control panel 24 in a lift car 10 of the lift system 1 from FIG. 1. The video camera 6, an indicator 6*b*, the input unit 6*a* and a keypad 26 are housed in this exemplary control panel 24. There is a large number of possible design options for the control panel 24; for example, the control panel 24 may have a glass front which behind the video camera 6, the indicator 6*b*, some or all components of the input unit 6 and the keypad 26 are arranged.

The video camera 6 in this case is arranged at the upper end of the control panel 24, so that the video camera 6 has an optimized range of vision over the interior of the car 10. If the control panel 24 extends from the floor of the car 10 to the ceiling thereof, for example, the video camera 6 is located close to the ceiling, which means that video recordings can be made from an elevated position. The field of vision of the video camera 6 in this case is also the least obscured by a passenger standing in front of it. In addition, the video camera 6 in this case is as far as possible from the reach of passengers, which means that the risk of vandalism is reduced. The risk of damage to the video camera 6 is also reduced by the fact that the video camera 6 is arranged behind a glass front. If the glass front is configured so that the video camera 6 is not readily recognizable (made of tinted glass or having a design/pattern, for example, obscures or conceals a lens of the video camera 6), the deliberate concealment or damaging of the video camera 6 is made more difficult.

The indicator 6*b* serves to provide the passengers in the car 10 with information. Depending on the configuration, it may inform passengers of the existence of the video camera 6, display an operating state of the video camera 6 (on/off, activation in x seconds) and/or show additional information (e.g. that on a given floor L1, L2, L3 an anonymized (e.g. a fuzzy, pixelated, distorted and and/or disguised) image of the car interior is shown or that a clear image has been requested.

Depending on the desired functionality of the indicator 6*b*, its design may be more or less complex. In one embodiment, for example, a light source (e.g. an LED-based light source) only indicates the operating state of the video camera 6. In another exemplary embodiment, the indicator 6*b* may comprise an LCD display, on which individual words, text, symbols or image information can be displayed. In a further embodiment, the indicator 6*b* may, in addition, be equipped with or connected to a speaker, in order to reproduce acoustic signals and/or announcements.

The person skilled in the art will recognize that the indicator 6*b* can be integrated in the video camera 6, above all in the form of an LED light source. In relation to the layout, the person skilled in the art will moreover recognize that the video camera 6 may also be arranged separately from the control panel 24, for example on the ceiling of the car 10.

The keypad 26 allows a passenger to enter a car call, i.e. after getting into the car 10, the passenger can enter a desired destination floor by means of the keypad 26. Alternatively, the lift system 1 may be equipped with a destination control system, with which the passenger enters a desired destination floor even before entering the car 10. In this case, the keypad 26 could be dispensed with or the number of keys could be reduced to a minimum (for example, keys for "open door", "close door" or "emergency").

In the exemplary embodiment shown in FIG. 2, the input unit 6*a* is arranged close to the keypad 26; they are both arranged in such a manner that a passenger can easily use them. In an exemplary embodiment, the input unit 6*a* comprises a device for detecting an authorization parameter which is assigned to a passenger. In an exemplary embodiment, this device is a reading device for an information carrier carried by a passenger. If the passenger presents the information carrier to the reading device, said reading device reads information from the information carrier which is used, for example, to identify a user authorization. Only if the passenger is entitled to use the input unit 6*a*, can they make an entry. The input unit 6 may have one or more keys or a touchscreen, depending on the configuration.

In an exemplary embodiment, the information carrier has a card-like design, for example in the form of a credit card or a staff ID card. Depending on the design, located in or on the information carrier is an externally contactable memory chip, an RFID transponder in conjunction with a memory chip or an externally optically readable code, e.g. a QR code or a barcode. Alternatively, the functions of the information carrier can also be implemented on a portable electronic device (e.g. mobile phone or smart phone). QR codes, barcodes or colour sample codes, for example, may be represented on the displays of devices of this kind. Devices of this kind also allow a wireless connection to be made to other electronic devices, for example via wireless technologies known in the art, for example Bluetooth or NFC. The reading device of the input unit 6*a* is of course compatible with the technology used by the information carrier. The person skilled in the art will moreover recognise that the reading device may also be configured for more than one technology.

In another exemplary embodiment, authorization to make an entry can also be given in that the passenger uses a code to unlock the input unit 6*a* and make an entry. It is also possible that a code of this kind can be used to open a cover behind which the input unit 6*a* is accessible.

Each video monitor 4 is connected in FIG. 1 to the video control device 8 which selectively controls the display of video information on the individual video monitors 14. The video information may comprise individual words, symbols, text, a (freeze) frame and/or a video recording, with or without an audio signal in each case. In the exemplary embodiment described here, the video information is a video recording from the car 10, indicating a current situation in the car 10 in real time on the video monitor 4. Each video monitor 4 may also display general information, such as building information (for example a message from the building management, business directory, restaurants, etc.) or current information (e.g. weather, news or financial information) as video information. Information of this kind may, for example, be displayed when the car 10 is at a standstill (all video monitors 4 then display this general information) or if no video recording from the car 10 was requested or is desired on one or more given floors. According to one exemplary embodiment, a video recording from the car 10 is only displayed on a floor L1, L2, L3 when this is requested on this floor L1, L2, L3. The default setting, so to speak, if no such request is made, is for the aforementioned general information to be displayed on the video monitors 4.

The input unit 4*a* in the exemplary embodiment shown is disposed at or in the vicinity of the video monitor 4 or is integrated therein. In an exemplary embodiment, the input unit 4 has a similar design to the input unit 6*a*, which means that it may have a reading device for an information carrier and keys or a touchscreen for entering commands. The input unit 4*a* may be combined with a floor terminal for entering a destination call. In one exemplary embodiment, the video monitor 4 may also be integrated in the floor terminal.

With the understanding of the structure of the lift system 1 and the functions of its components, the description of exemplary embodiments of a method of operating the lift system 1 is provided in conjunction with FIG. 3-FIG. 6. These figures show exemplary flow charts of a method of operating the lift system 1 according to different operating modes, The method according to FIG. 3 begins with a step S1 and ends with a step S5. In a step S2, a control parameter is received by the video control device 8. This control parameter represents one of several operating modes which are available for selection in the lift system 1. In a following step S3, the video control device 8 selects one of several operating modes, depending on the control parameter. In a step S4, the video control device 8 controls the lift system 1 and the video system according to the selected operating mode.

Figure 4:
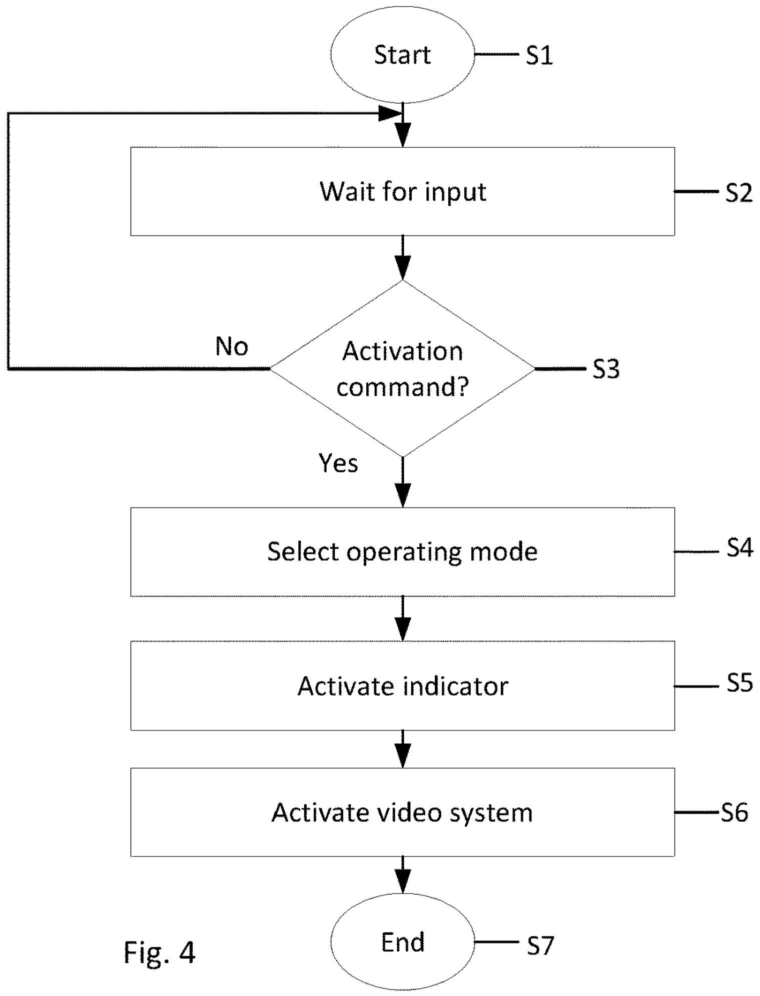
FIG. 4 shows an exemplary representation of a process sequence for operating the lift system according to an operating mode.

FIG. 4 shows an exemplary flow chart of a method of operating the lift system 1 according to an operating mode in which the display of a video recording from the car 10 can be requested on a particular floor L1, L2, L3. The method begins with step S1 and ends with step S7.

In step S2, the process waits for an input on one of the input units 4*a*, 6*a*. If, for example, a person waiting on a floor L1, L2, L3 asks for a video recording from the car 10 to be displayed, for example by pressing a key on the input unit 4*a*, a control parameter corresponding to an activation command is generated. If an activation command of this kind exists in step S3, the method continues along a "yes" branch to step S4. By contrast, if there are no control parameters present, the method proceeds along the "no" branch back to step S2 and waits for an input.

In step S4, the first operating mode is selected, according to which a video recording is displayed on the video monitor 4. The video control device 8 then performs various actions to make this possible. These include in step S5 activation of the indicator 6*b* in the car 10 and in step S6 activation of the video system. Depending on the design of the indicator 6*b*, a light source comes on and/or an electronic display (for example text, image/or symbol) provides information on the existence of the video system and the status (active/inactive) thereof, wherein these possibilities can be combined with an acoustic signal. The activation of the video system, for example, comprises a switching-on of the video camera 6, a switching-on of the video monitor 4 on the floor L1, L2, L3 from which activation has been requested and/or a transmission of the video recording to the video monitor 4. In an exemplary embodiment, the sequence of steps S5 and S6 may be reversed. In another exemplary embodiment, steps S5 and S6 may also be executed substantially simultaneously.

In the exemplary embodiment shown, the indicator is 6*b* (step S5) is activated before the video system (step S6), in order to alert a passenger in the car 10 of the imminent activation of the video system. In an exemplary embodiment, activation of the video system in step S6 only takes place after a specified period of time (e.g. a few seconds) has elapsed following activation of the indicator 6*b* in step S5. By activating the indicator 6 it is guaranteed that the passenger in the car 10 will be informed that they are being watched or are about to be watched. If necessary, the passenger can turn away from the video camera 6 and/or hide their face to protect their identity as far as possible. Even in this case, the display of the video recording on the video monitor 4 provides the information that the car 10 is not empty. If it is not necessary or desirable for the face to be visible, this notification "Car not empty" may be sufficient.

In one embodiment, the video system is deactivated as soon as the car 10 is ready to be entered at the floor L1, L2, L3 from which the display of the video recording was requested. For example, if a person waiting for the lift has requested the video recording, this person has no further need for information when the car 10 is ready for entry with its door open on the floor of L1, L2, L3. Alternatively, the video system may be deactivated after a specified period of time (e.g. a few seconds). This period of time can be chosen in such a manner that it is sufficient to inform the person waiting of the current situation in the car 10 (e.g. not empty). In an exemplary embodiment of this kind, a video recording lasting for the entire journey may be neither necessary nor desirable.

In an exemplary embodiment, a display is only possible on a video monitor 4 when the video monitor 4 is on the floor L1, L2, L3 which is also actually served by the car 10 during the journey. Video monitors 4 on floors L1, L2, L3 which are not served by the car 10 on this journey cannot be used to observe other passengers, for example.

Figure 5:
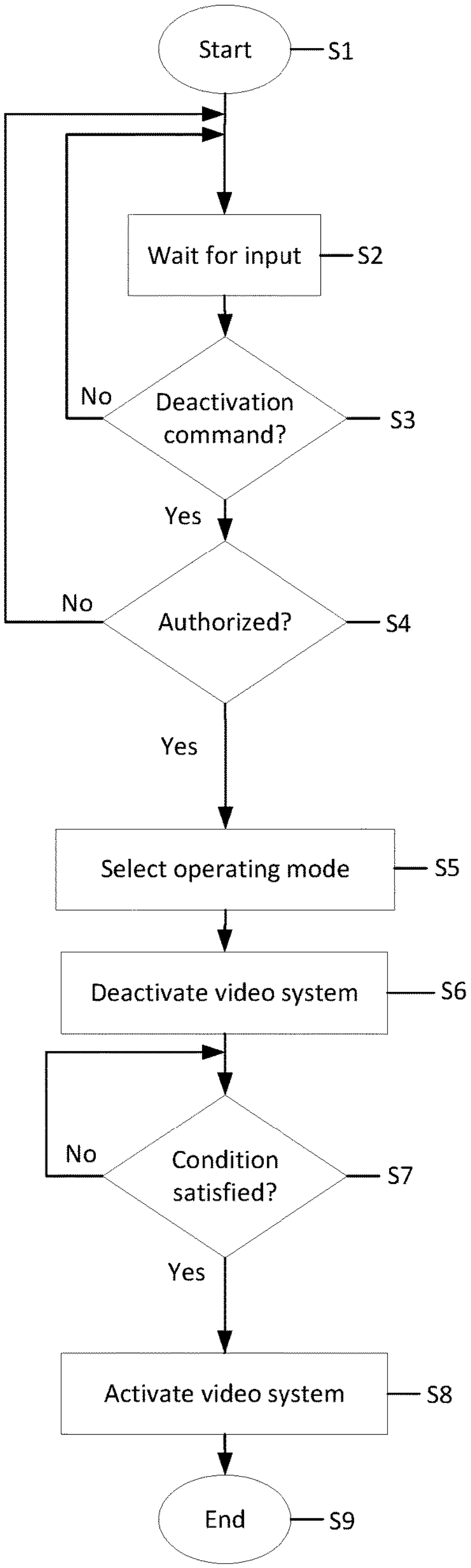
FIG. 5 shows an exemplary representation of a process sequence for operating the lift system according to another operating mode.

FIG. 5 shows an exemplary flow chart of a method of operating the lift system 1 according to a further operating mode, in which the video system remains deactivated or is deactivated in order to adequately safeguard the privacy of a passenger, for example. The method starts at step S1 and ends at step S9.

At step S2, the process waits for an input at one of the input units 4*a*, 6*a*. If, for example, a person entering the car 10 on a floor L1, L2, L3 expresses the desire for privacy, for example by pressing a key on the input unit 6*a* in the car 10, a control parameter is generated which corresponds to a deactivation command. If a deactivation command of this kind is present in step S3, the method proceeds along a "yes" branch to step S4. By contrast, if there is no control parameter present, the method proceeds along the "no" branch back to step S2.

As an alternative to pressing a key in the car, the person may express their wish for "privacy" while still on the floor L1, L2, L3 on the input unit 4*a*, before getting into the car 10. This is something that may, for example, be reserved for authorized individuals (see step S4 below).

A check is made in step S4 to determine whether an authorization to request privacy exists. This may take place, for example, in that the passenger must first present an information carrier, as described above, must enter a PIN or unlock the input unit 6*a* with a code. If no authorization exists, an entry is not possible or an entry that has already been made will be ignored. An authorization of this kind may, for example, exist for registered passengers who live or work in the building, or for passengers with high requirements and/or very important persons (VIP). The person skilled in the art will appreciate that in an exemplary embodiment the passenger may be asked to present the information carrier, enter the PIN or unlock the input unit 6*a* with a code while still outside the car 10.

In a step S5, the other operating mode is chosen, according to which the video system is deactivated if it was in an active state or activation is inhibited/blocked if it is in an inactive state. The video control device 8 may then perform various actions, for example display the deactivation in the car 10 and/or turn off the video camera 6. In an exemplary embodiment, the video system will remain deactivated until it is reactivated by a corresponding control parameter.

In an exemplary embodiment according to FIG. 5, the video system will remain deactivated until a predetermined condition is satisfied in step S7. The predetermined condition in an exemplary embodiment may be the elapsing of a predefined period of time. In another exemplary embodiment, the predetermined condition may be the ending of a journey from a boarding floor L1, L2, L3 to a destination floor L1, L2, L3. If the condition is satisfied, the method continues along the "yes" branch to a step S8 in which the video system is activated.

Further criteria may be defined in other exemplary embodiments. If the video system has been deactivated by a VIP, for example, it cannot be reactivated (for example by a corresponding entry on an input unit 4*a*), as long as the VIP is travelling in the car 10. This means that the desired privacy during the journey cannot be cancelled by an external event.

If the video system is active again following step S8, it may remain active, depending on the embodiment, or be deactivated after a specified period of time. If, for example, there is no desire to travel, the video system may be inactive.

Figure 6:
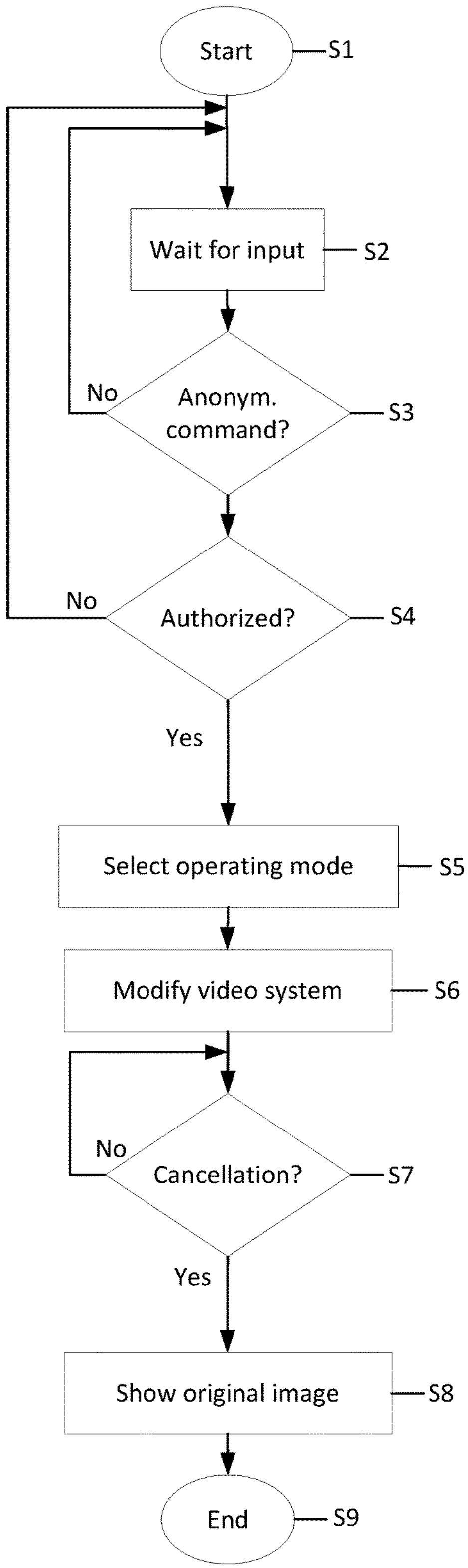
FIG. 6 shows an exemplary representation of a process sequence for operating the lift system according to a third operating mode.

FIG. 6 shows an exemplary flow chart of a method of operating the lift system 1 according to a third operating mode in which the video recording is selectively modified, in order to adequately preserve the privacy of a passenger, for example. The method starts at step S1 and ends at step S9.

At step S2, the process waits for an entry on one of the input units 4*a*, 6*a*. If, for example, a person waiting on a floor L1, L2, L3 asks for a video recording from the car 10 to be displayed according to the second operating mode, after which the indicator 6*b* is activated, the passenger in the car 10 has the option of requesting anonymization of video recording, so that faces can be made unrecognizable by pixelation, for example. If the passenger taps a key on the input unit 6, for example, a control parameter is generated which corresponds to an anonymization command.

If an anonymization command of this kind exists at step S3, the process proceeds along a "yes" branch to step S4. By contrast, in the absence of a control parameter, the process continues along the "no" branch back to step S2.

Alternatively, the passenger can request anonymization of the video recording from the floor L1, L2, L3 on the input unit 4*a* before even getting into the car 10. This may be an option for passengers who are familiar with the lift system 1, for example, and appreciate the security offered by the video system, but still want a degree of privacy.

In step S4 a check is made to determine whether authorization to request anonymization exists. This may happen, for example, in a similar manner to that described above in conjunction with FIG. 5.

If authorization exists, the third operating mode is selected in step S5. In step S6, the video control device 8 then controls the video camera 6 in an exemplary embodiment, so that a modified video image is produced. A blurred video recording can be produced, for example. Alternatively, the video control device 8 can edit the video recording by means of image processing software known to the person skilled in the art, in order to reduce the clarity of the entire recording or to pixelate or distort it, or to use a facial recognition process to make only a person's face unrecognizable. A modified video image which is anonymized is also thereby generated.

Generation of a modified video image can be cancelled in an exemplary embodiment. In step S7, the process checks whether a corresponding control parameter (cancel command) exists. If it does exist, the method proceeds along the "yes" branch to step S8 and the video image or the video recording are displayed in the original (e.g. without pixelation). If there is no cancellation command, the modification of the video image is maintained.

In an exemplary embodiment, it is possible to display in the car 10 by means of the indicator 6*b* that an original video recording has been requested. A period of time can likewise be specified for this, after which transmission of the original video recording starts. This allows a passenger to prepare for this, as mentioned above.

A cancellation command may, for example, be made on an input unit 4*a*. Different situations can arise in a building that make it necessary for the original video recording to be displayed. If, for example, there is a breach of security (an unauthorized person in the building) or a criminal offence has been committed by a person in the building, the interest in finding the person concerned takes priority over privacy interests. In a case like this, security personnel can enter a cancellation command. Depending on the system configuration, another person (e.g. VIP) may also be entitled to enter a cancellation command.

In addition to the exemplary embodiments and operating modes described above, the lift system 1 can also be configured so that the lift car 10 on at least one floor L1, L2, L3 travels directly into an apartment or a room in a business or office. The apartment or room in this case can be entered through a door (e.g. a shaft door or a combination of a shaft door and a car door) of the lift car 10. A video monitor 4 is arranged in the apartment or room in each case. An input unit 4*a* may also be disposed there, as required.

In a lift system 1 of this kind, a kind of "housing mode" may be implemented. The video monitor 4 in the apartment or room makes it possible in an exemplary embodiment for a person located there to look at a display of the video recording from the lift car 10 when the lift car 10 is travelling to the floor L1, L2, L3 of the apartment or the room. The person unlocks the door of the lift car 10 only when the passenger is, for example, known, registered, identifies themselves and/or can be trusted. The person may, for example, tap a key on the video monitor 4 or the input unit 4*a* to unlock, as a result of which a command to unlock the door is sent to the lift control system 12. After receiving the command, the lift system 12 controls the unlocking of the door, in order to allow a passenger on a floor L1, L2, L3 to leave the lift car 10 on the floor L1, L2, L3.

Otherwise, the door remains locked (initially) for security reasons and an intercom system can be activated. In an exemplary embodiment, it may be provided that if the door remains locked, the lift car 10 moves back after a specified period of time or when a control command to the entry floor is triggered by the person in the apartment/room.

The display of the video recording on the video monitor 4 may take place automatically, as soon as the lift cab 10 begins its journey to the floor L1, L2, L3 of the apartment or room. However, the display can also only take place at the request of the individual.

In an exemplary embodiment, the video system can transmit the video recording, for example to a mobile electronic device with a screen, e.g. a mobile phone, a smart phone or a smart watch. For this purpose the video monitor 4 may be equipped with a (programmable) interface device for an Internet and/or radio connection. By means of this interface device, the video monitor 4 transmits the video recording after corresponding programming (e.g. target information (IP address), time information (start/end)), for example as streaming media to the mobile device.

If the individual is not in the apartment or room, they can nevertheless monitor and control access to the apartment or room remotely. This means that the individual can grant access to visitors, suppliers and/or employees, for example, despite their absence. In this way, the individual's security interests are also respected.

In the lift system 1, it may also be provided in an exemplary embodiment that the video system stores a video recording on a storage medium (e.g. in digital form on a hard disk). The storage may be flexibly configured in terms of timing, so that, for example, a recording is only made of the last journey or recordings are made of journeys within a specified period of time, e.g. the last 2 hours or the last day. If necessary, for example in the investigation of crimes, a stored recording can be viewed. This makes it possible to determine, for example, who last traveled to a given floor L1, L2, L3.

What is claimed is:

1. A lift system comprising:

a lift car that can be moved between floors of a building;

a video system with a video camera arranged in the lift car for recording images of an interior of the lift car and at least one video monitor configured to display information based on the images and relating to the interior of the lift car; and a video control device communicatively connected to the video system and configured to control the video system in a selective manner according to one of several operating modes, wherein the video control device controls the video system according to a first operating mode if a passenger asks for the video system to be deactivated, wherein in the first operating mode, the video system is deactivated or activation is blocked, so that the video system remains in an inactive state, wherein the video system remains in the inactive state for as long as the passenger is in the lift car.

2. The lift system according to claim 1, further comprising a lift control system and a device for identifying an authorization parameter assigned to the passenger, wherein the lift control system is communicatively connected to the video system and the device for identifying the authorization parameter, in order to control the video system according to one of several operating modes.

3. The lift system according to claim 1, further comprising a first input unit on a floor on which a first video monitor is present, wherein the first input unit for entering a control parameter for the video system is provided and wherein the control parameter is used to select an operating mode.

4. The lift system according to claim 3, further comprising a second input unit in the lift car, wherein the second input unit is provided for the input of a control parameter for the video system and wherein the control parameter is used for selecting an operating mode.

5. The lift system according to claim 3, in which a control parameter comprises at least one of an activation command, a deactivation command and an anonymization command, wherein an operating mode is assigned to the at least one of the activation command, the deactivation command and the anonymization command.

6. The lift system according to claim 1, further comprising an indicator within the lift car, configured to indicate an operating state of the video camera.

7. A method of operating a lift system comprising a lift car that can be moved between floors of a building, a video system with a video camera arranged in the lift car for recording images of an interior of the lift car and a video monitor configured to display information based on the images and relating to the interior of the lift car and a video control device communicatively connected to the video system, comprising:

receiving a control parameter by the video control device;

selecting one of several operating modes by the video control device depending on the control parameter received, wherein a first operating mode is selected when the control parameter corresponds to a deactivation command when a passenger requests deactivation of the video system, wherein in the first operating mode, the video system is deactivated or activation is blocked, so that the video system remains in an inactive state; and controlling of the video system according to the selected operating mode, wherein the deactivation of the video system is maintained in the first operating mode for as long as the passenger is in the lift car.

8. The method according to claim 7, further comprising selecting a second operating mode when the control parameter corresponds to an activation command, wherein in the second operating mode the video system is activated by the video control device and the activation is indicated in the lift car by an indicator and wherein information relating to the interior of the lift car is displayed on the video monitor.

9. The method according to claim 7, further comprising cancelling the deactivation after a specified condition has been met.

10. The method according to claim 9, wherein the specified condition is the lapse of a predefined time period or end of a journey from a boarding floor to a destination floor.

11. The method according to claim 7, further comprising determining whether the passenger requesting deactivation of the video system is authorized to do so and deactivating the video system only when the passenger is authorized to deactivate.

12. The method according to claim 7, further comprising selecting a third operating mode when the control parameter corresponds to an anonymization command, wherein in the third operating mode an anonymized video recording from the interior of the lift car is displayed on the video monitor.

13. The method according to claim 12, wherein the video control device controls the display of the video recording on the video monitor, a non-anonymized video recording is displayed when a corresponding request command is present and wherein the request for a non-anonymized video recording is indicated in the lift car.

14. The method according to claim 7, further comprising receiving a command for unlocking a lift door of the lift car by a lift control system and unlocking the lift door by the lift control system to allow a passenger on a floor to leave the lift car on the floor.

15. The method according to claim 14, further comprising activating a drive unit by the lift control system if no command to unlock the lift door is received, to move the lift car to a departure floor, wherein activation takes place after a specified period of time or upon receipt of a control command.

16. The method according to claim 7, further comprising the displaying of information relating to the interior of the lift car on the video monitor, wherein the video monitor is arranged on a floor or is integrated in a mobile electronic device.

* * * * *